(12) United States Patent
Bosworth et al.

(10) Patent No.: US 10,739,074 B2
(45) Date of Patent: Aug. 11, 2020

(54) METALLURGICAL APPARATUS

(71) Applicant: PYROTEK, INC., Spokane, WA (US)

(72) Inventors: Paul Bosworth, Burton-on-Trent (GB); Jason Dennis Midgely, Burton-on-Trent (GB)

(73) Assignee: PYROTEK, INC., Spokane, WA (US)

( * ) Notice: Subject to any disclaimer, the term of this patent is extended or adjusted under 35 U.S.C. 154(b) by 115 days.

(21) Appl. No.: 15/746,659

(22) PCT Filed: Jul. 22, 2016

(86) PCT No.: PCT/US2016/043605
§ 371 (c)(1),
(2) Date: Jan. 22, 2018

(87) PCT Pub. No.: WO2017/015577
PCT Pub. Date: Jan. 26, 2017

(65) Prior Publication Data
US 2018/0216890 A1    Aug. 2, 2018

Related U.S. Application Data

(60) Provisional application No. 62/196,055, filed on Jul. 23, 2015.

(51) Int. Cl.
*F27D 27/00*    (2010.01)
*F27D 3/14*    (2006.01)
(Continued)

(52) U.S. Cl.
CPC ............ *F27D 27/005* (2013.01); *F27B 14/06* (2013.01); *F27B 14/14* (2013.01); *F27D 3/14* (2013.01);
(Continued)

(58) Field of Classification Search
CPC .. F27B 14/06; F27B 14/14; F27D 2099/0015; F27D 27/005; F27D 3/14; F27D 99/00
(Continued)

(56) References Cited

U.S. PATENT DOCUMENTS

| 6,217,823 B1 | 4/2001 | Vild et al. |
| 9,597,726 B2 | 3/2017 | Takahashi |

(Continued)

FOREIGN PATENT DOCUMENTS

| WO | 2014175002 A1 | 10/2014 | |
| WO | 2014202966 A1 | 12/2014 | |
| WO | WO2014202966 | * 12/2014 | ........... F27D 27/005 |

*Primary Examiner* — Jessee R Roe
*Assistant Examiner* — Michael Aboagye
(74) *Attorney, Agent, or Firm* — Fay Sharpe, LLP (57) ABSTRACT

A circulating apparatus for circulating the body of molten metal within an associated furnace is provided. The circulating apparatus includes a molded body with an inlet and an outlet. The inlet and the outlet are aligned with corresponding openings on the associated furnace. The inlet and the outlet define a flow chamber within the molded body. An inductor is secured to a portion of the molded body. The inductor is configured to pump molten metal from the associated furnace and into the flow chamber. A flow channel is spaced from the inlet and the outlet on the molded body. A dam assembly is positioned adjacent the outlet. The dam assembly is movable between a raised position and a lowered position relative to the outlet. The molten fluid flows back into the associated furnace when the dam assembly is in the raised position and the molten fluid flows to the flow channel when the dam assembly is in the lowered position.

15 Claims, 9 Drawing Sheets

(51) Int. Cl.
*F27B 14/14* (2006.01)
*F27D 99/00* (2010.01)
*F27B 14/06* (2006.01)

(52) U.S. Cl.
CPC ...... *F27D 99/00* (2013.01); *F27D 2099/0015* (2013.01); *Y02P 10/253* (2015.11)

(58) Field of Classification Search
USPC ......... 266/234, 44, 901, 216, 233, 235, 236, 266/237; 75/687
See application file for complete search history.

(56) References Cited

U.S. PATENT DOCUMENTS 10,215,495 B2 * 2/2019 Bosworth ............. C21C 5/5247
2011/0074072 A1 3/2011 Rauch \* cited by examiner

METALLURGICAL APPARATUS

BACKGROUND OF THE INVENTION

The present invention relates to a metallurgical apparatus and a method of circulating molten metal within a metallurgical apparatus.

In one embodiment, the invention relates to a furnace for melting metals including, but not limited to, non-ferrous metals such as aluminium, magnesium and zinc. Such furnaces generally include a circulator device for circulating the melt within the furnace to ensure even heating and distribution of alloys. Various circulator devices are known, including mechanical pump, electromagnetic pumps, agitating and stirring devices.

JP 10146650A describes a furnace with an electromagnetic inductor stirring device comprising a disc-shaped permanent magnet located below the floor of the furnace. The magnet can be rotated and the resulting rotating magnetic field causes rotation of the melt in the furnace by electromagnetic induction. The disclosure of JP10146650A is herein incorporated by reference.

EP 1674814A describes an agitator for agitating a melt, which has a plurality of permanent magnets mounted on a motor-driven rotor. Rotation of the rotor creates a rotating magnetic field, which can be used to pump melt through a passageway that extends between inlet and outlet openings in a wall of the furnace. This causes circulation of the melt in the furnace. The disclosure of EP1674814A is herein incorporated by reference.

US 2011/0248432A1 describes an electromagnetic pump that has a plurality of permanent magnets mounted on a motor-driven rotor. A spiral passageway extends through a housing that surrounds the rotor and melt can be pumped through this passageway by the rotating magnetic field created by the rotating magnets. The disclosure of US2011/0248432A1 is herein incorporated by reference.

Hertwich Engineering of Braunau Austria supply a range of electromagnetic pumps and stirrers for circulating and mixing molten metal. These devices include side channel pumps and stirrers, which use an electromagnetic pump to pump melt through a side channel formed in the wall of a furnace, and a tube pump that uses an electromagnetic pump to pump melt through a tube, for example from one chamber of a furnace to another.

WO2014/202966A1 describes a metallurgical vessel for holding and circulating a body of liquid metal. The vessel has a peripheral wall and a circulating apparatus comprising a launder than provides an open-topped flow channel. The disclosure of WO2014/202966A1 is herein incorporated by reference.

The above-mentioned circulator devices all include one or more disadvantages. The external electromagnetic stirring device described in JP 10146650A is expensive to implement and the magnetic field produced by the permanent magnets penetrates the metal to only a fixed shallow depth which does not drive circulation of the metal efficiently. The magnetic rotors described US 2011/0248432A1 and EP 1674814 only act on a limited amount of metal in the melt passageways, producing only a relatively weak flow. The melt passageway also has to be designed so the metal remains in close proximity to the magnetic rotor for as long as possible, which restricts the shape of the passageway to a relatively narrow U shape and so dictates the flow direction of metal as it leaves the passageway. The melt passageways of the systems described US 2011/0248432A1 and EP 1674814, as well as the circulator devices supplied by Hertwich Engineering, cannot easily be cleaned and can become blocked by dross and other materials. Also, where the external passageways are provided, these cannot always be preheated effectively, giving rise to a risk that they could become damaged by thermal shock upon contact with the molten metal, or they could cause the metal to freeze thereby blocking the passageway.

SUMMARY OF THE INVENTION

The exemplary embodiment has been described with reference to the preferred embodiments. Modifications and alterations will occur to others upon reading and understanding the detailed description. It is intended that the exemplary embodiment be construed as including all such modifications and alterations insofar as they come within the scope of the appended claims or the equivalents thereof.

The present invention provides a metallurgical vessel and a method of circulating molten metal within a metallurgical vessel. According to the one aspect of the present invention, a circulating apparatus for circulating the body of molten metal within an associated furnace is provided. In certain embodiments, the body will be formed of a refractory material. In certain embodiments, the body will be formed from a cast ceramic material. The circulating apparatus includes a body with an inlet and an outlet. The inlet and the outlet are aligned with corresponding openings on the associated furnace. The inlet and the outlet communicate with a flow channel within the body. A wall notch can be formed in the flow channel between the inlet and the outlet. An inductor is secured to a portion of the body.

In certain embodiments the inductor is located below the floor of the flow channel and adjacent the inlet. The inductor can be configured to drive molten metal from the associated furnace and into the flow channel. A dam assembly is positioned adjacent the outlet. It is also conceivable that the dam assembly is located in an alternative location along the flow channel. The dam assembly is movable between a raised position and a lowered position. The molten metal flows back into the associated furnace when the dam assembly is in the raised position and the molten fluid rises in the flow channel when the dam assembly is in the lowered position and accesses the wall notch. This allows the device to function both as a circulator and a transfer apparatus.

The wall notch can be associated with a spout for pouring of the molten metal into a ladle, for example, or associated with a launder for transport of the molten metal to a casting operation, for example. As the skilled artisan will recognize, the closing of the dam in combination with continued operation of the inductor results in elevation of the molten metal within the flow channel such that the molten metal can access the wall notch.

The flow channel may optionally be open topped (for example, it will typically be U-shaped), and it may optionally include a cover that can be closed to overly and seal the flow channel. This cover can however be removed or opened to provide access to the flow channel. This allows the flow channel to be cleaned, so that dross and other contaminants can be removed. This disclosure therefore provides the advantage of allowing metal to be circulated in the furnace using an external pumping device in an economical and efficient manner, while avoiding the problems associated with the build-up of dross and other contaminates in the flow channel, thus providing high quality metal.

The circulating apparatus may include a heating system for heating the flow channel to a desired operating temperature. This helps to protect the circulating apparatus against being damaged by thermal shock when it comes into contact with the molten metal, and it ensures that the temperature of the metal does not fall significantly while flowing through the flow channel, thus avoiding the risk of the metal freezing and blocking the flow channel. The flow channel can be defined by a filler layer of a thermally conductive refractory material between a ceramic trough body and the electrical heating element. The filler layer may for example be made of a castable refractory material having a thermal conductivity of at least 3 W/m·K, at least 5 W/m·K or at least 6.5 W/m·K. The heating system can include at least one electrical heating element configured to heat the circulating apparatus. Alternatively, other types of heating systems may be used, including hot gas systems and combustion-based systems, for example using gas burners to heat the flow channel.

The pumping device can be an inductor that generates a moving magnetic field within the flow channel to pump molten metal along the flow channel. The use of an inductor provides for non-turbulent flow of the molten metal through the flow channel, and enables the molten metal to be driven through the circulating apparatus without coming into contact with any physical pumping devices. Problems of erosion by contact with the metal are thereby avoided.

The use of an inductor also produces a strong vector type flow, which aids circulation of the molten metal within the furnace. The circulating apparatus can be designed to direct this flow to strategic areas of the furnace to ensure greater homogeneity of the metal in the bath. In addition, the mass flow of the molten metal can be directed towards the position at which scrap metal is introduced into the furnace, thereby benefitting the heat absorption rate of the scrap metal and reducing the melting time. The entry angles of the flow channel and the internal profile of the flow channel can be adjusted to maximise this vector effect. The system is not therefore subject to the same design limitations of systems that use permanent magnet rotors.

Advantageously, the inductor includes a control device that is configured to control the pumping rate of the inductor. The control device preferably includes a level measuring device for measuring the level of molten metal within the circulator, and may be configured to control the pumping rate of the pumping device according to a measured level of molten metal within the circulator. The mass flow of the molten metal can thus be adjusted to achieve optimum thermal efficiency within the main body of the vessel. The level measuring device may alternatively, or in addition, be used as a safety device to halt operation of the inductor if, for example, the outlet end of the circulator becomes blocked, causing the level of melt in the circulator to rise.

The circulator may include at least one flow control device that is adjustable between an open configuration in which the flow of molten metal between the flow chamber and the furnace is permitted, and a closed configuration in which the flow of molten metal between the flow chamber and the furnace is prevented. The flow control device may for example consist of a dam or sluice gate that can be raised to permit flow, or lowered to prevent or restrict flow. The dam can also be positioned so that the lowest part of the dam is just beneath the surface of the molten metal, allowing metal to flow under the gate while holding back dross (oxides or other contaminants) floating on the surface of the metal. The positioning of the dam can be automated, for example using level sensing technology, to prevent dross from entering the circulator, and the positions of the dams can be adjusted as the level of metal in the furnace changes.

Optionally the circulator may include an additional flow leg for guiding a flow of molten metal to or from the furnace so that it can be transferred to other metallurgical vessels.

According to another aspect of the invention there is provided a method of circulating molten metal in a metallurgical apparatus according to any one of the preceding statements of invention, comprising pumping molten metal through the circulator so that molten metal flows out of the furnace through the first opening and into the furnace through the second opening, thereby causing the body of molten metal within the furnace to circulate.

BRIEF DESCRIPTION OF THE DRAWINGS

Various embodiments of the invention will now be described by way of example with reference to the accompanying drawings, wherein.

DETAILED DESCRIPTION

Reference will now be made in detail to the present preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications, and equivalents as may be included within the spirit and scope of the invention defined by the appended claims.

Figure 1:
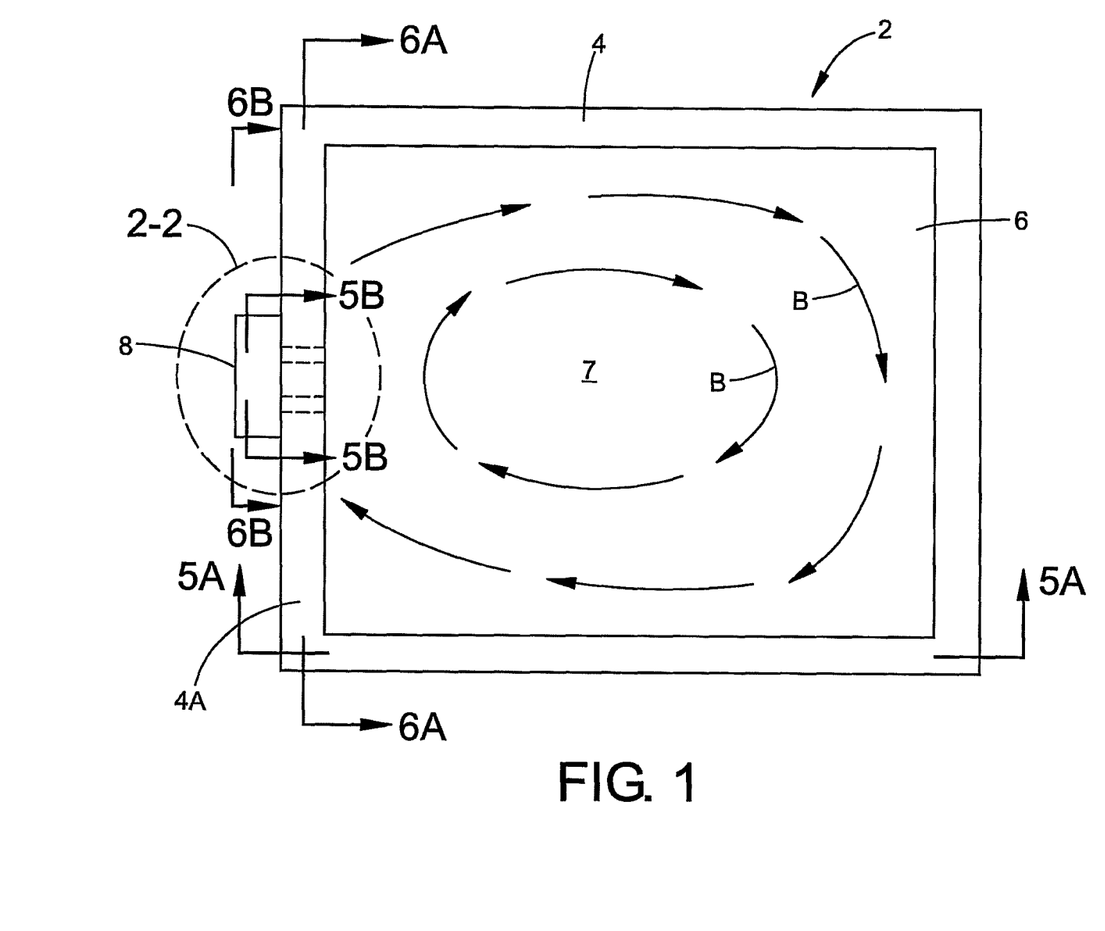
FIG. 1 is a plan view of a furnace having a circulator device.
Figure 2:
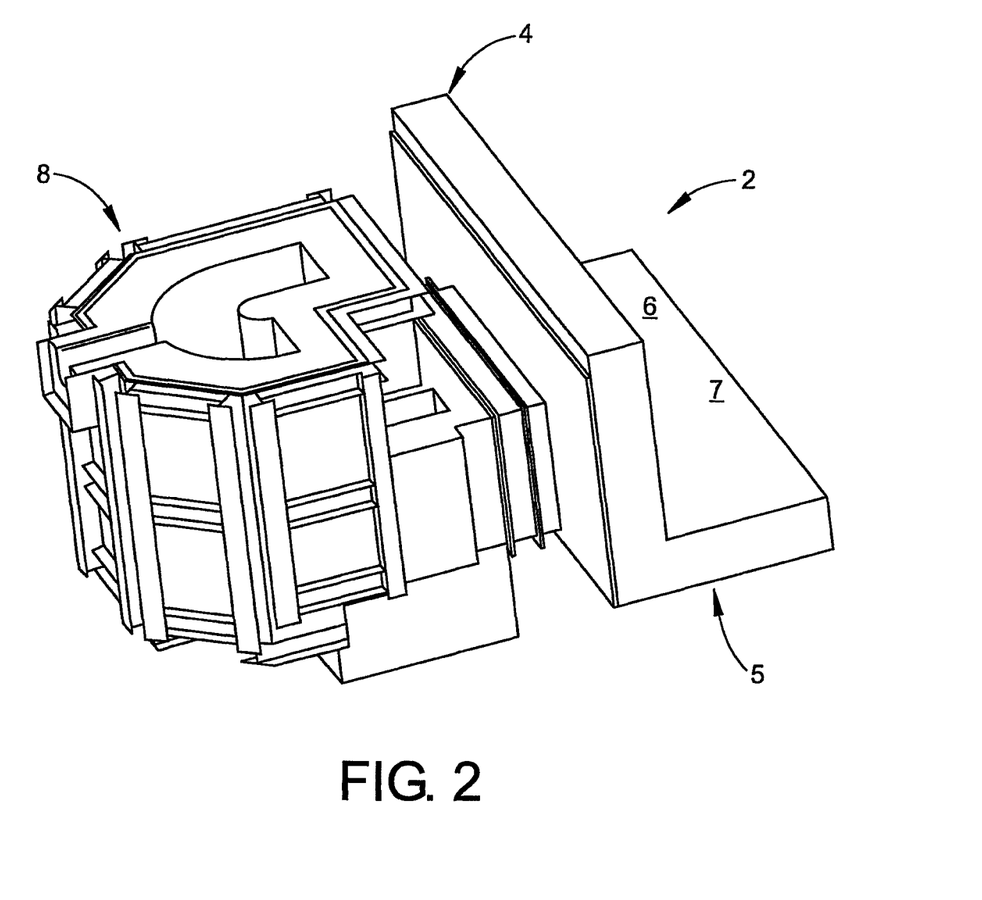
FIG. 2 is a perspective view of section 2-2 of FIG. 1.

FIGS. 1 and 2 depict a metallurgical vessel, in this example a furnace 2, comprising a four-sided peripheral wall 4 and a base 5 that holds a body of molten metal 6 (or "melt") in an interior portion 7 of the furnace 2. In this example, the furnace 2 is made of a suitable refractory material and includes a conventional heater (not shown) for heating and melting metal in the furnace. The furnace 2 may be intended either for melting metal or for holding molten metal during a refining or casting process. It may be designed for use either with non-ferrous metals such as aluminium, magnesium or zinc, or any other ferrous or non-ferrous metals and metal alloys.

As shown in FIGS. 1 and 2, the furnace 2 includes a circulator/transfer device 8 (illustrated schematically in FIG. 1) for circulating the body of molten metal 6 in the furnace 2. The circulator/transfer device 8 is externally mounted on a side wall 4a of the furnace 2 and fluidly connected to the interior portion 7 of the furnace 2, allowing molten metal to flow to and from the furnace 2 through the circulator/transfer device 8. The circulator/transfer device 8 is configured for a metal lift of at least approximately 1150 mm, for example, and a flow rate of molten metal 6 of at least approximately 1 metric ton per minute.

Figure 3:
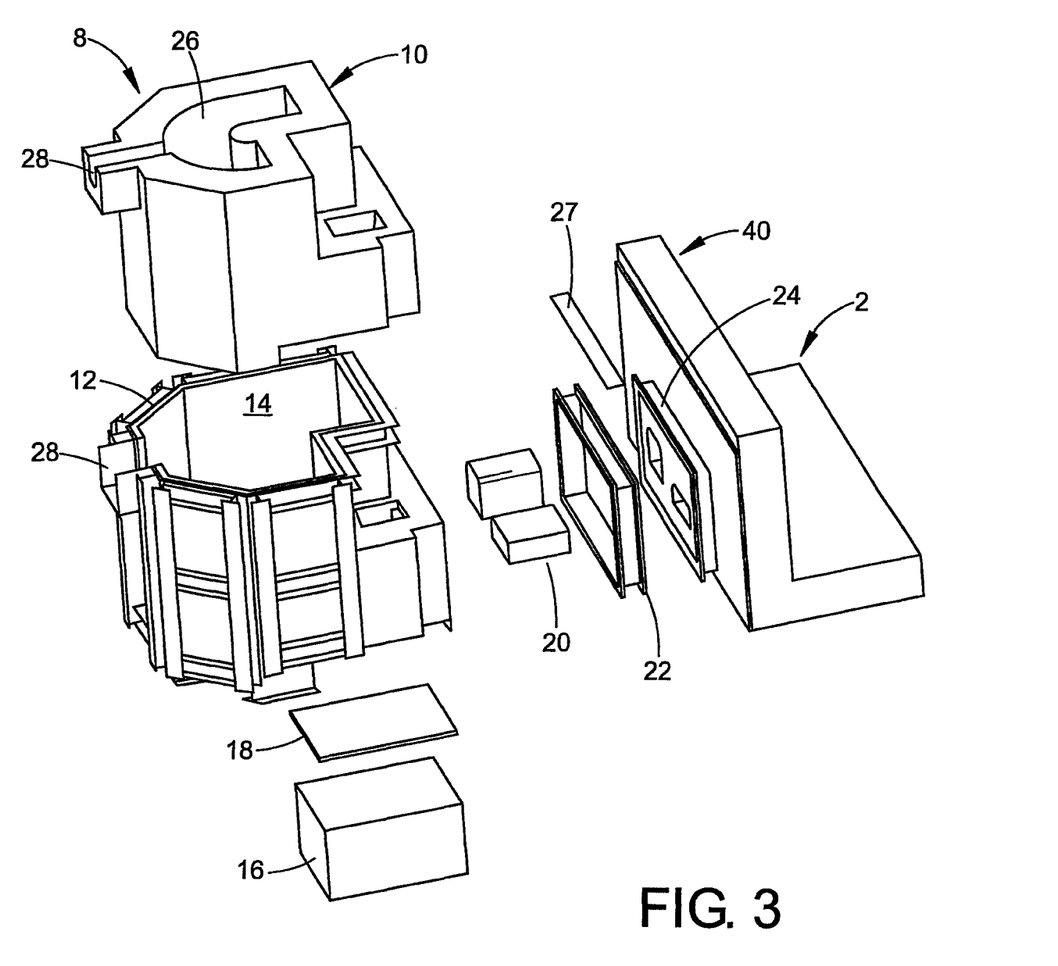
FIG. 3 is an exploded view of FIG. 2.

FIG. 3 shows an exploded view of the circulator/transfer device 8. The circulator/transfer device 8 includes a molded body 10 that can be made by any suitable process. The molded body 10 fits inside of a shell 12, which can be made of steel (or any other suitable material). A layer of insulation 14 separates the molded body 10 from the shell 12. In some instances, the molded body 10, the shell 12, and the insulation layer can include complementary flanged portions to ensure a secure fit therebetween. Advantageously, the molded body 10 can be replaced as needed without having to replace either the shell 12 or the insulation 14.

To pump the molten metal 6 to the circulator/transfer device 8, an electromagnetic inductor 16 is mounted to a suitable portion of the molded body 10 (such as below a floor of a flow channel 26). A plate 18 (i.e., made of stainless steel, for example) is mounted between the molded body 10 and the inductor 16 to ensure a proper current path therebetween. The inductor 16 can have at least 3.0 N/m or at least 4.5 N/m for power for optimal operation. The inductor 16 produces forces in two directions (i.e., an X-axis and a Y-axis). These forces are a combination of these directions and vary in intensity and strength. The inductor 16 can be removed for maintenance without the need for removal or disconnection of the transfer well from the furnace. A cooling system (e.g., a water cooling medium, air cooling, water atomization, and the like) can be used to cool the inductor 16.

One or more covers 20 are positioned within corresponding inlets and/or outlets (not shown in FIG. 3) of the circulator/transfer device 8 to connect the inlets and outlets of the circulator/transfer device 8 to the corresponding openings in the furnace 2. The covers 20 can be made of any suitable polymer to ensure a fluid-tight seal between the furnace 2 and the molded body 10. In addition, a frame 22 connects the circulator/transfer 8 to a flange 24 that is fixed to the side wall 4a of the furnace 2.

The frame 22 can include a removable lid 27 to: (1) inspect the covers 20; and (2) pour a refractory between the circulator/transfer 8 and the furnace 2. The refractory can be silicon carbide to assist in thermal transfer with the additional benefit that this material brings good mechanical wear strength and good non-wetting properties. The refractory thickness at the inductor 16/molten metal 6 interface will be between about 100 mm and 300 mm to reduce the force requirement along the Y-Axis. Thus, there is a maximum force along the X-axis to enable efficient laminar flow and reduce any back flow when the system is transferring metal above a static bath level inside the furnace 2. The frequency and voltage applied to the inductor from the electrical power and control supply will enable maximum field penetration into the molten metal without the need to reduce the depth of refractory in the tunnel above and below the inductor. The inverter/power supply frequency and voltage can be variable to allow adjustment, wherein lower frequency allows greater penetration yet higher frequency provide greater velocity. Moreover, it may be desirable to initiate molten metal movement at a low frequency and once movement commences, use a higher frequency to increase flow rates.

The circulator/transfer device 8 includes a wall notch 28 formed in a portion of the molded body 10, the shell 12, and the insulation 14. Referring back to FIG. 2, the wall notch 28 can be substantially U-shaped in horizontal section.

Figures 4A, 4B, 4C:
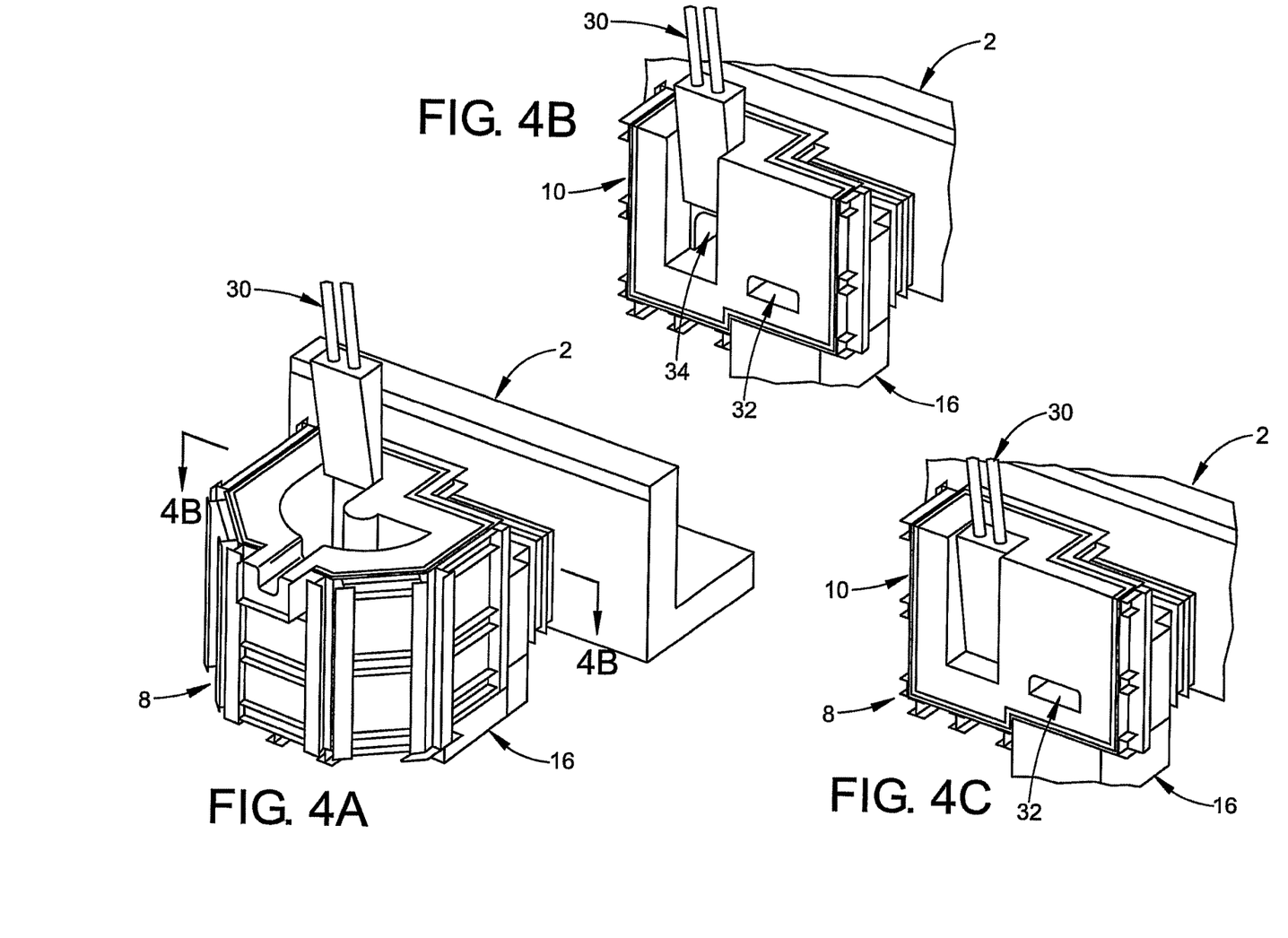
FIG. 4A is a perspective view of the furnace and circulator device of FIG. 1.
FIG. 4B is a cross-sectional view taken along line 4B-4B of FIG. 4A.
FIG. 4C is an alternative view of FIG. 4B.

Referring now to FIG. 4A, the circulator/transfer device 8 further includes a dam assembly 30 attached thereto. The dam assembly 30 is movable between a raised position and a lowered position. The dam assembly 30 is operably connected to an actuating mechanism (not shown), such as a pulley system, magnets, hydraulics, a winch system, and the like, so that it can be raised or lowered relative to the circulator/transfer 8. The dam assembly 30 may for example consist of a dam or sluice gate that can be raised to permit flow, or lowered to prevent or restrict flow. The dam assembly 30 can also be positioned so that the lowest part of the dam assembly 30 is just beneath the surface of the molten metal, allowing metal to flow under the gate while holding back dross (oxides or other contaminants) floating on the surface of the metal. The dam assembly 30 is controlled by a controller (not shown). The dam assembly 30 can prevent flow of fluid from the furnace 2 through an outlet (not shown in FIG. 4A) of the circulator/transfer device 8, and thereby direct flow to the wall notch 28, as described in more detail below. If the circulator/transfer device 8 is only required for circulation and there is no requirement for the transfer function, the dam assembly 30 can be removed.

Referring now to FIG. 4B, the circulator/transfer device 8 includes an inlet 32 and an outlet 34 that extend through the molded body 10, the insulation 14, and the shell 12. The inlet 32 and the outlet 34 are aligned with corresponding openings (not shown) on the side wall 4a of the furnace 2. The inlet 32 and the outlet 34 define a flow channel (not shown in FIG. 4B) within the molded body 10.

As shown in FIG. 4B, the dam assembly 36 is positioned adjacent the outlet 32. The dam assembly 30 is movable between a raised position and a lowered position. The dam assembly 30 is raised or lowered relative to the outlet 32. The dam assembly 30 can prevent flow of fluid from the furnace 2 through the outlet 32 (i.e., by blocking the outlet 32), and thereby direct flow to the wall notch 28, as described in more detail below.

During use, the inductor 16 drives molten metal through the circulator/transfer 8. Specifically, the inductor 16 drives molten fluid from inside of the furnace 2 and into the circulator/transfer 8 via the inlet 32. As shown in FIG. 4B, the dam assembly 30 is in a "raised" position, thereby exposing the outlet 34. As a result, fluid flows from the inlet 32, through the flow channel, and back into the furnace 2 via the outlet 34.

FIG. 4C shows the dam assembly 30 in a "lowered" position, thereby covering the outlet 34. As a result, the molten fluid collects in the flow channel and rises therewithin until it reaches the wall notch 28. The molten fluid then flows to a collection mechanism via the wall notch 28.

Figure 5A:
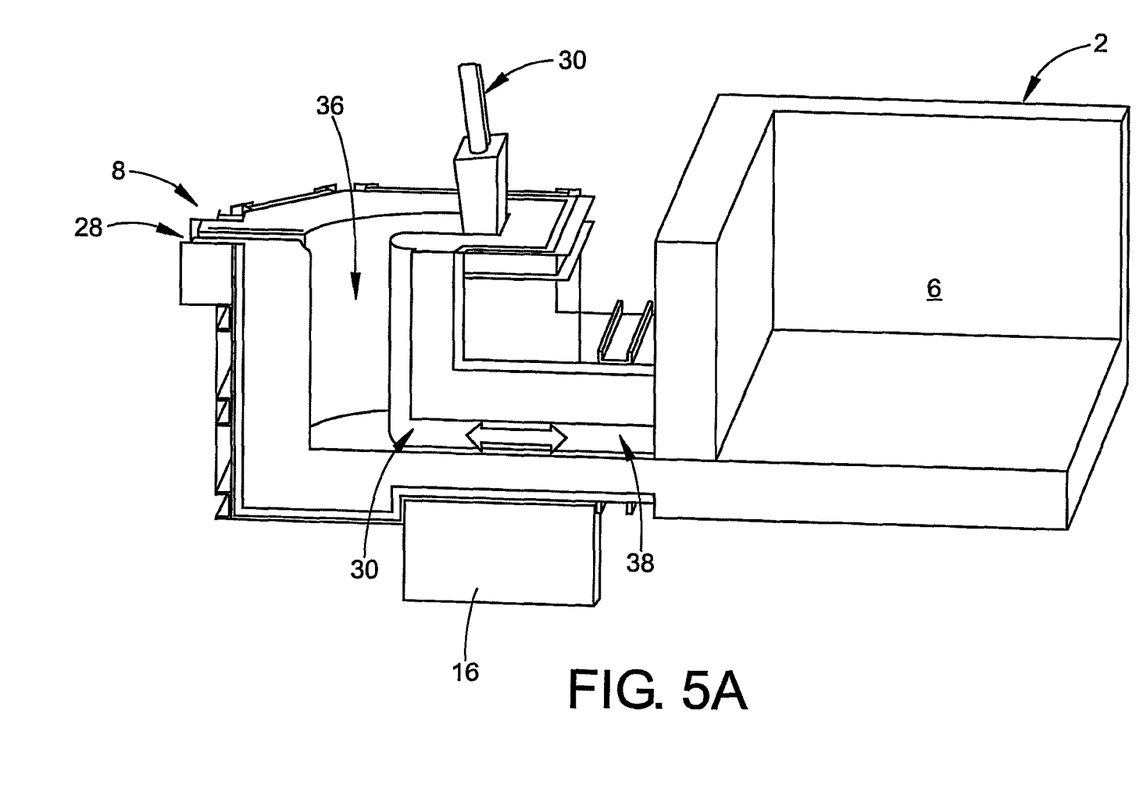
FIG. 5A is a cross-sectional view taken along line 5A-5A of FIG. 1.

FIG. 5 shows a side view of the circulator/transfer device 8 attached to the furnace 2. A flow chamber 36 is shown within the circulator/transfer device 8. The flow channel 36 is defined by the inlet 32 and the outlet 34. The inlet 32 is fluidly connected to an interior of the furnace 2 via a tunnel 38. The inductor 16 drives molten fluid from the interior of the furnace 2 and into the flow channel 36. A second tunnel (not shown) fluidly connects the outlet 32 to the interior of the furnace 2. It will be appreciated that, when the dam assembly 30 is in the closed position, the flow chamber 36 fills up with the molten metal and rises to a level where it flows to the wall notch 28.

Figure 5B:
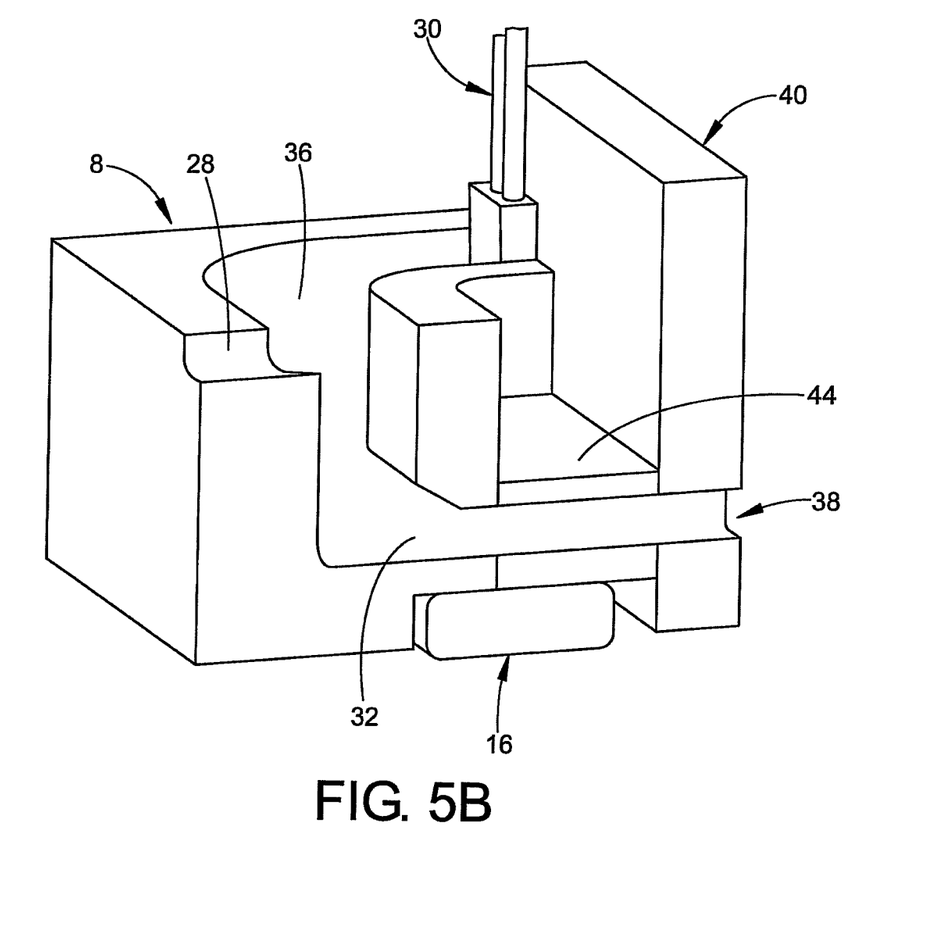
FIG. 5B is a cross-sectional view taken along line 5B-5B of FIG. 1.

In a slightly modified configuration, the tunnel 38 (see FIG. 5B) can be formed by the addition of a removable cover plate 44 disposed above the tunnel and the associated inductor 16. Advantageously, the removable cover plate 44 allows access to the tunnel region 38 for cleaning. Furthermore, it is envisioned that the cover plate 44 can include flux guides (e.g. magnetized metal components such as steel) to enhance the function of the inductor by improving the vertical lines of magnetic flux that pass through the tunnel. The cover plate can be comprised of silicon carbide or graphite or an alternate refractory material having the metal components (e.g. rods) embedded or disposed in recesses formed therein.

Figure 6A:
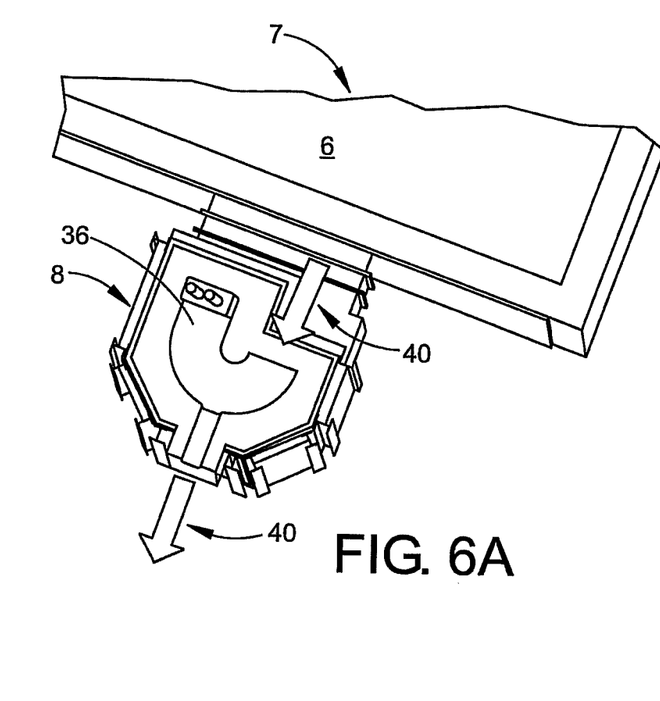
FIG. 6A is a cross-sectional view taken along line 6A-6A of FIG. 1.
Figure 6B:
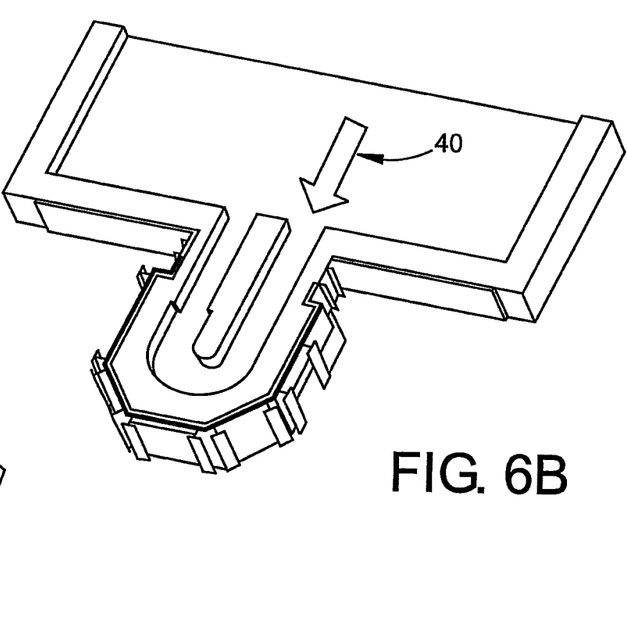
FIG. 6B is a cross-sectional view taken along line 6B-6B of FIG. 1.

FIGS. 6A and 6B show a flow path 40 of the molten metal from the interior of the furnace, through the inlet 32, and out of the wall notch 28.

Figure 7A:
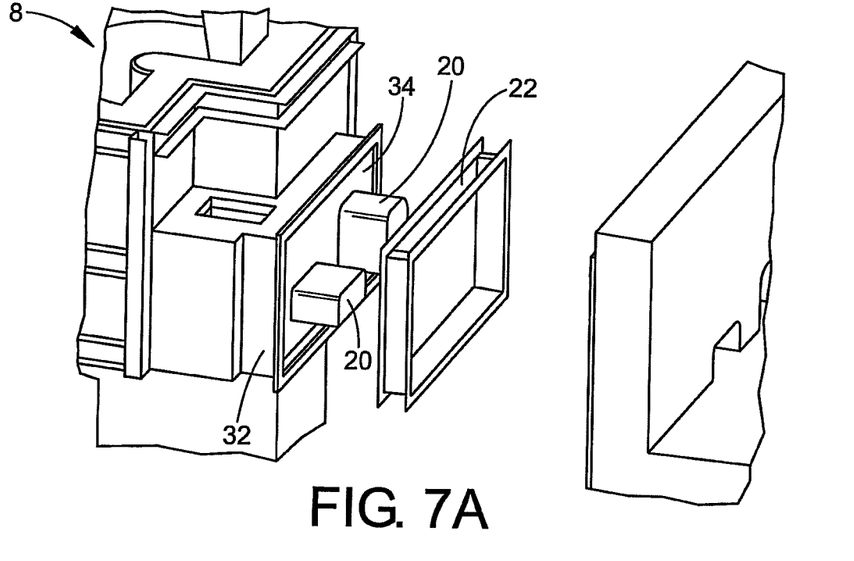
FIG. 7A is a perspective view showing assembly of the circulator device to the furnace of FIG. 1.
Figure 7B:
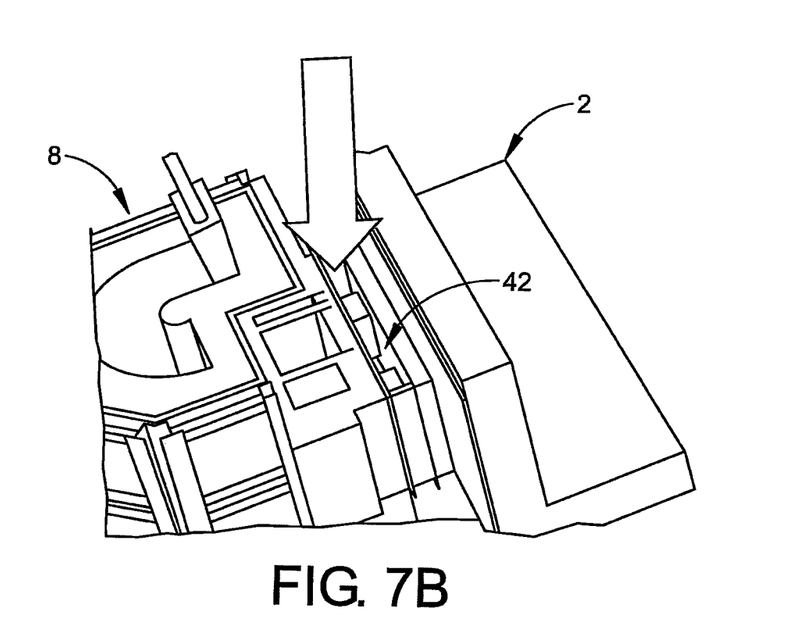
FIG. 7B is an assembled view of the circulator device and the furnace of FIG. 7A.

FIGS. 7A and 7B show the installation of the circulator/transfer 8 to the furnace 2. As shown in FIG. 7A, the covers 20 are placed into the inlet 32 and the outlet 34 of the circulator/transfer device 8, and into the first tunnel 38 (not shown in FIG. 7A) and second tunnel of the furnace. The plate 22 is then used to mount the circulator/transfer device 8 to the side wall 4a of the furnace 2. FIG. 7B shows the lid 26 (not shown in FIG. 7B) removed to show an opening 42 where the refractory is poured in. Access to the opening 42 enables a thermocouple or laser for metal level monitoring to be added to support or control the metal circulation and enhance the melting process. The opening 42 also enables access to charge alloy additions and remove molten metal samples for quality control purposes. In addition, the opening 42 can includes a burner (not shown) located on the lid that covers the whole of the transfer well to assist in keeping the opening 42 hot for start-up and between charges when used as part of a dry hearth melting process.

Figure 8:
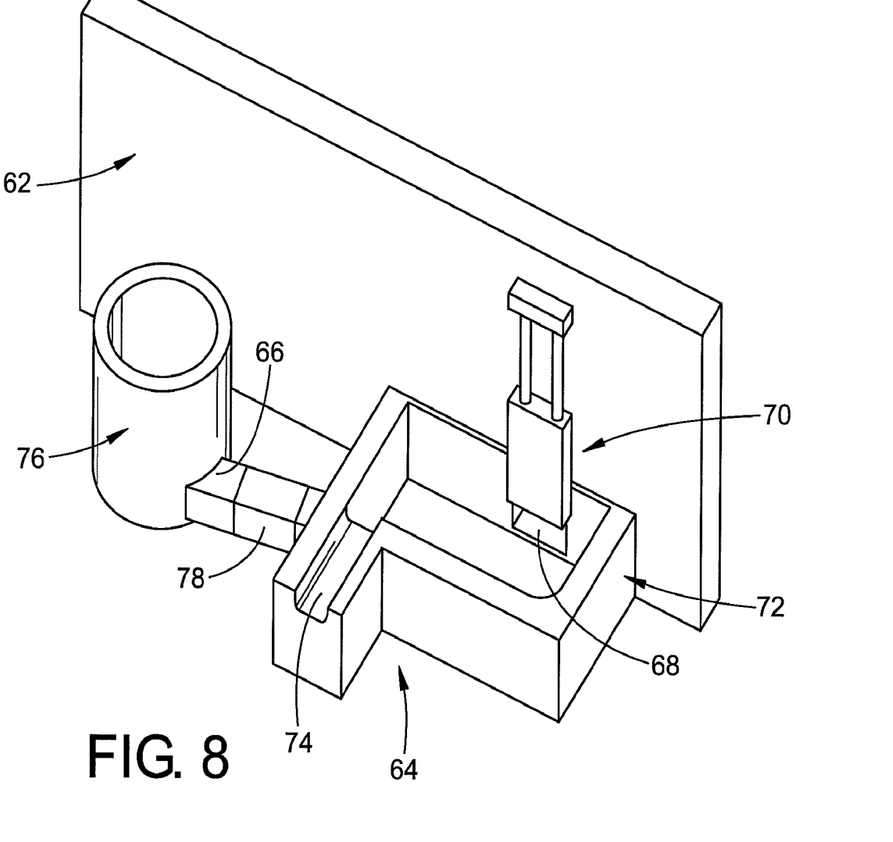
FIG. 8 is an alternative circulator device configuration.

Referring now to FIG. 8, an alternative configuration is depicted. In this configuration the flow pattern from furnace 62 into the circulation device 64 is still achieved via an inlet 66 and an outlet 68. Furthermore, outlet 68 is again equipped with a selectively openable and closeable dam door 70.

Furthermore, it is noted that in contrast to the prior embodiments where a generally U-shaped flow channel has been provided, the subject embodiment includes a side well 72 as a component of the circulator. More particularly, outlet 68 is in fluid communication with side well 72. In addition, overflow notch 74 is formed in association with side well 72. Sidewell 72 advantageously provides a molten metal working surface facilitating, for example, the removal of dross or the introduction of alloying or fluxing agents to the molten metal being circulated.

The present embodiment also differs from those depicted above in that a charge well unit 76 is provided. Charge well 76 can receive metal chips and metal pieces for melting. The charge well 76 can be a LOTUSS device of the type available from Pyrotek, Inc. An exemplary LOTUSS device is described in U.S. Pat. No. 6,217,823, herein incorporated by reference. An inductor device 78 is positioned between the charge well 76 and the side well 72.

Advantageously, the inductor can be run in either direction allowing molten metal to be directed clockwise for introduction into the charge well 76 allowing for formation of the desired vortex of molten metal which is used to effectively submerge metal pieces or chips. When removal of molten metal from the system is desired, dam door 70 can be closed and the inductor operated in a reverse (counter clockwise) direction. This operation fills the side well 72 to the point where molten metal reaches notch 74 for transfer to a vessel such as a ladle or a launder (not shown).

It is further noted that while an inductor is depicted in the embodiment of FIG. 8, it is further contemplated that a mechanical centrifugal pump could be substituted. As a further alternative, it is envisioned that a pair of mechanical pumps configured for directing molten metal in alternative directions could be introduced into the system. For example a first molten metal pump could be located where the inductor is shown in FIG. 8 with a design intended for a clockwise molten metal flow and a second molten metal pump configured for counter clockwise molten metal flow could be positioned, for example, in the side well.

Various other modifications of the systems described above are also possible. For example, a customer may have two furnaces that both require circulation (either independently or at the same time). The circulation system on each furnace may be operated independently with its own power supply, however the circulation systems would share a common control system that controls the power supplies. They may also share a common water cooling system.

The system may also incorporate a vessel for external charging of "materials" (scrap or alloys) into the furnace.

It is also possible to combine the flow channel with a series of dams or plugs, and to use one pump to circulate molten metal at any given time in any one of two or more furnaces. Typically, the system will be arranged to cause circulation of metal in whichever furnace is in a melting phase. The configuration of flow chambers may also be designed to allow for the transfer of molten metal between furnaces.

According to another aspect of the invention the flow channel may be replaced by a closed passageway, for example a tubular passageway. The invention then comprises a metallurgical apparatus comprising a vessel for holding a body of molten metal and a circulating apparatus for circulating the body of molten metal within the vessel, wherein the vessel has a peripheral wall and a base, and the circulating apparatus comprises a passageway that provides the flow channel. An inductor device can be provided for pumping molten metal through the passageway. The passageway can be an inlet end connected to a first opening in the peripheral wall and an outlet end connected to a second opening in the peripheral wall. The inductor can be configured to pump molten metal through the passageway so that molten metal flows out of the vessel through the first opening and into the vessel through the second opening, thereby causing the body of molten metal within the vessel to circulate. The passageway may include a heating system for heating the passageway to a desired operating temperature.

The flow channel above the inductor can be a tunnel rather than an open top passageway. The coil design is as such to enable as much force as possible in the x direction to enable efficient laminar flow and reduce any back flow when the system is transferring metal above the static bath level inside the furnace. The frequency and voltage applied to the inductor from the electrical power and control supply will enable maximum field penetration into the molten metal without the need to reduce the depth of refractory in the tunnel above and below the inductor. Access to the transfer well enables a thermocouple or laser for metal level monitoring to be added to support or control the metal circulation and enhance the melting process. The transfer well also enables access to charge alloy additions and remove molten metal samples for quality control purposes.

If the system is only required for circulation and there is no requirement for the transfer function, the transfer dam gate can be removed from the transfer well. The inductor can be removed from the system for maintenance without the need for removal or disconnection of the transfer well from the furnace. The system can have a water cooling medium for the cooling of the inductor but a further option is to use air cooling and/or water atomisation cooling in the future. The inlet and outlet apertures (tunnels) in the transfer well can be cast in silicon carbide refractory to assist in thermal transfer with the additional benefit that this material brings good mechanical wear strength and good non-wetting properties. The transfer well can have a burner located on the lid that covers the whole of the transfer well to assist in keeping the transfer well hot for start-up and between charges when used as part of a dry hearth melting process. The lining of the transfer well can be a single precast shape and the whole of the transfer well can be removed from the furnace to enable a replacement unit to be installed with minimal furnace down time.

Based on mathematical principles and ignoring any effect of friction or turbulence the EM power requirement for molten metal transfer may be about 4.5 N/m or greater. The coil design can have the power requirements for both the (X) and (Y) axis of about 30 N/m or greater.

In transfer mode a sliding gate could restrict the metal from flowing back into the furnace filling the transfer well and overflowing to the transfer flow channel. The inductor would be mounted underneath the transfer/circulation well. Inductor channel heating could come from a well cover with either: furnace heat, gas burner or electrical induction heating. Channel inspection or cleaning access can be provided by a bolt down channel top and a bolt on access port.

The EM inductor produces forces in two directions both horizontal (X) and vertical (Y) axis. Based on coil design these forces are a combination of these two directions and vary in intensity/strength. The present inductor can have preferentially greater force in the x axis to circulate the furnace bath. The refractory thickness of the vessel at the inductor/molten metal interface will be less than approximately 300 mm or 200 mm thick which reduces the force requirement of the (Y) axis.

The system can further include a control panel housing, a computer with touch screen display allowing the operator access to the operating status of the total system. The control system can include the following features:

Industrial computer Display c/w data logging
Alarm monitoring
PLC Control c/w Ethernet
Emergency stop circuit
Inverter control and adjustment control The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An apparatus for circulating molten metal within an associated furnace or transferring molten metal from the associated furnace, the apparatus comprising:
a body including an inlet opening and an outlet opening, the inlet opening and the outlet opening being aligned with corresponding openings on the associated furnace, the inlet opening and the outlet opening defining a flow channel within the body;
an inductor secured to a portion of the body, the inductor being configured to draw molten metal from the associated furnace and into the flow channel;
a wall notch spaced from the inlet opening and the outlet opening on the body; and
a dam assembly positioned adjacent to at least one of the inlet opening and the outlet opening, the dam assembly being movable between a raised position and a lowered position;
wherein the molten metal flows back into the associated furnace when the dam assembly is in the raised position and the molten metal rises within the flow channel and is capable of reaching the wall notch when the dam assembly is in the lowered position.

2. The apparatus of claim 1 wherein the inductor is formed in a floor of the apparatus.

3. The apparatus of claim 2 wherein the inductor is formed only in a floor of the apparatus.

4. The apparatus of claim 2 wherein the inductor is positioned in a tunnel section of the body.

5. The apparatus of claim 4 wherein a roof of said tunnel section comprises a steel plate.

6. The apparatus of claim 1 wherein said body comprises a cast ceramic.

7. The apparatus of claim 6 wherein said cast ceramic includes a steel shell.

8. The apparatus of claim 7 wherein insulation is disposed between said cast ceramic and said steel shell.

9. The apparatus of claim 1 wherein said flow channel includes a width and said width is substantially equivalent to a width of said dam assembly.

10. The apparatus of claim 1 further including a side well as a component of said flow channel.

11. The apparatus of claim 1 further including a scrap submergence apparatus as a component of said flow channel.

12. An apparatus for circulating molten metal within an associated furnace or transferring molten metal from the associated furnace, the apparatus comprising:
a body including an inlet opening and an outlet opening, the inlet opening and the outlet opening being aligned with corresponding openings on the associated furnace, the inlet opening and the outlet opening defining a flow channel there between within the body;
a pump configured to draw molten metal from the associated furnace and into the flow channel;
a wall notch associated with the flow channel and spaced from the inlet opening and the outlet opening;
a side wall forming a section of said flow channel;
a scrap submergence apparatus forming a section of said flow channel; and
a dam assembly positioned adjacent to at least one of the inlet opening and the outlet opening, the dam assembly being movable between a raised position and a lowered position;
wherein the molten metal flows back into the associated furnace when the dam assembly is in the raised position and the molten metal rises within the flow channel and is capable of reaching the wall notch when the dam assembly is in the lowered position.

13. The apparatus of claim 12 wherein said pump comprises an electromagnetic pump.

14. The apparatus of claim 12 wherein said pump comprises a centrifugal pump.

15. The apparatus of claim 12 wherein said pump comprises at least two centrifugal pumps.

* * * * *